June 11, 1963
C. L. WILSON ETAL
3,093,525
METHOD OF LAMINATION OF PLASTIC FILM AND
FOAM AND THE PRODUCT THEREFROM
Filed July 25, 1955
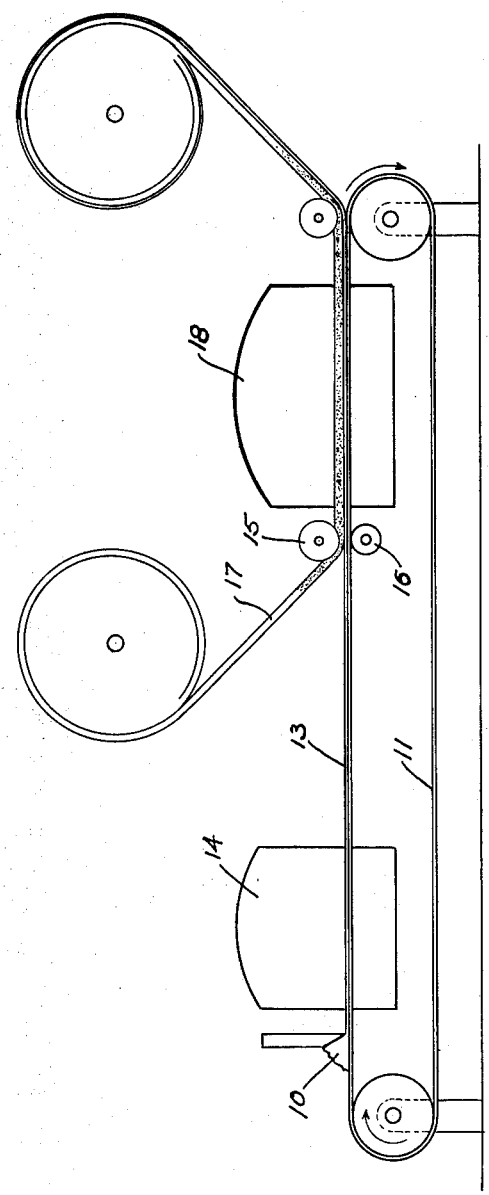
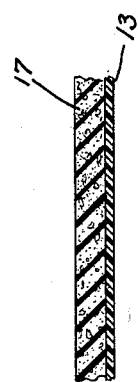
FIG. 3
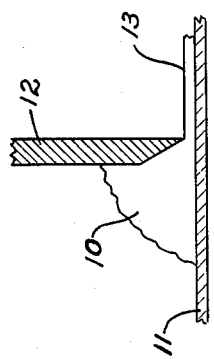
FIG. 2
FIG. 1
INVENTORS
OSCAR SHUFFMAN
BY CHRISTOPHER L. WILSON
*Irving Seidman*
ATTORNEY United States Patent Office 3,093,525
Patented June 11, 1963

3,093,525
METHOD OF LAMINATION OF PLASTIC FILM AND FOAM AND THE PRODUCT THEREFROM
Christopher L. Wilson, Cranberry Lake, Sloatsburg, and Oscar Shuffman, Yonkers, N.Y., assignors to Hudson Foam Plastics Corporation, Yonkers, N.Y., a corporation
Filed July 25, 1955, Ser. No. 523,986
6 Claims. (Cl. 156—79)

This invention relates to a method of laminating plastic films to synthetic foamed resins and the resultant article.

In a copending application Serial No. 441,984, filed July 8, 1954, there is disclosed the lamination of polyester foam materials to plastic films wherein adhesion is obtained by means of specific adhesives or by the application of heat. Both the polyester foam and the plastic films are in their finally cured states, except in one case wherein the polyester foam is formed in situ and in contact with a preformed plastic film.

The present invention is concerned with the lamination of polyester-diisocyanate foams of the character described in said copending application and other copending applications including Ser. No. 420,744, filed April 2, 1954, now U.S. Patent No. 2,961,418, to a polyvinyl chloride film, the joinder of the foam and film being accomplished before the film is completely cured.

In the drawing:

FIG. 1 is a diagrammatic showing of the laminating procedure embodying the invention;

FIG. 2 is an enlarged detail showing of the formation of the polyvinyl chloride layer; and FIG. 3 is a sectional view of the laminated product embodying the invention.

In accordance with the invention, a preformed, cured foam of polyester-diisocyanate is derived from a reaction product of adipic acid and diethylene glycol having an acid number between about 0 and 20 and a hydroxyl number between about 20 and 100, the reaction product being mixed with a mixture of toluene diisocyanate 2,4 and 2,6, a small amount of water and a tertiary amine catalyst. A reaction occurs which results in the formation of a light weight, resilient foamed product which is combined with a layer of incompletely cured polyvinyl chloride in the form of a plastisol or organosol, the cure thereof being completed while the same is in contact with the foam. It is understood that other flexible, resilient polyester-diisocyanate foams, disclosed in said applications, may be similarly laminated to the polyvinyl chloride layer.

The polyvinyl chloride film being in incompletely cured form prior to lamination, imprinting or embossing the incompletely cured materal is facilitated, to produce a laminated product which is suitably ornamented on the exposed film surface. Furthermore, the polyvinyl chloride may be compounded with blowing agents to provide a porous structure in the cured plastic layer of the laminated product.

In accordance with the instant invention, the polyvinyl chloride may be used in the form of a plastisol wherein the powdered polyvinyl chloride is suitably dispersed in one or more liquid plasticzers; or as an organosol wherein organic solvents such as xylene or diisobutyl ketone is used with plasticizer to disperse the polyvinyl chloride. With a plastisol, the pasty mass may be spread or poured onto a suitable surface and heated to a temperature of from 120° to 180° C. to convert the same into a homogeneous, tough elastic layer, the heating period being varied in accordance with the molecular weight of the resin and the specific plasticizers used.

The organosols cure at lower temperatures and provide films of minimum thickness, such films being particularly smooth and of uniform appearance. Also, smaller proportions of plasticizers may be used in forming the organosols.

Plasticizers used to form both the plastisols and organosols may include di-(2 ethylhexyl) phthalate, adipate or sebacate; trioctyl and tricresyl phosphates; dibutoxyethyl phthalate; tetrahydroxyfurfuryl oleate, and the like. The polyvinyl chloride resins should be of medium molecular weight such as sold under the name of Geon 121, by B. F. Goodrich Co., or Vinylite QYNV by Bakelite Corp. The proportion of plasticizer used varies in accordance with the curing temperature used and the flexibility desired. Generally, the plasticizer will amount to from about 30% to about 50% of the completed plastisol film.

The polyvinyl chloride may also be compounded with stabilizers such as lead carbonate, barium or cadmium ricinoleate or dibutyl tin dilaurate, which inhibit the adverse affects of thermal or light decomposition; with a pigment or dye for color; and a filler such as finely divided silica or calcium carbonate. Also, the flow properties of the resin dispersion may be controlled by including additives such as aluminum stearate or bentonite, which give a thixotropic characteristic to the plastisol, allowing the resin to be formed in desired shapes.

If chemical blowing agents are added to the resin, such agents will evolve gases during the curing of the polyvinyl chloride film or layer to provide communicating or non-communicating pores. Such blowing agents include diazoamino compounds, nitrosoamines, sulfonic acid hydrazides, ammonium bicarbonate, and the like. With communicating pores, the polyvinyl chloride film will have "breathing" properties which are of particular value in applications thereof for upholstery or clothing where heat and/or moisture from the human body must be dissipated.

By way of example, the following formulations may be used to form the products of the instant invention.

(1) For a plastisol combine the following by weight:                                       Parts
    Geon 121 resin _____ 182
    Dioctyl phthalate _____ 212
    Barium ricinoleate _____ 4.5
    Titanium dioxide _____ 5.0
    Cadmium ricinoleate _____ 4.5

(2) For a porous plastisol combine the following by weight:
    Geon 121 resin _____ 100
    Tricresyl phosphate _____ 105
    Cadmium ricinoleate _____ 4
    Sulfonic acid hydrazine ("Celogen") _____ 25

(3) For an organosol combine the following by weight:
    Geon 121 resin _____ 100
    Butyl benzyl phthalate _____ 60
    Dioctyl phthalate _____ 60
    Dibasic lead phosphite _____ 3
    Phthalocyanine green pigment _____ 5
    Xylene _____ 10

(4) For a porous plastisol combine the following by weight:
    Geon 121 resin _____ 100
    Tricresyl phosphate _____ 10
    Basic lead sulfate _____ 5
    Methyl abietate _____ 80
    Hydrocarbon plasticizer (Solvoloid C) _____ 20
    Celogen _____ 20

The laminating operation for combining the preformed polyester-diisocyanate foam and the polyvinyl chloride film, may be carried out in a continuous manner as shown in FIG. 1.

Thus, any of the formulations indicated above, after suitable milling to properly combine the ingredients thereof, as shown in FIG. 1, is disposed as a mass 10 on an endless belt conveyor 11, a doctor blade 12 forming a layer 13 of determined thickness on the belt. The thus formed layer 13 passes through an oven 14 which is heated to a temperature ranging from 80° to 120° C. which partially cures the layer 13. The partially cured layer continues its movement toward a pair of opposed compression rollers 15, 16 where a layer of preformed polyester-diisocyanate foam 17 is pressed into contact with the layer 13. At this point foam layer 17 may be temporarily reduced in thickness by as much as 50% of the normal thickness of said layer, said normal thickness being reassumed as the combined layers 13, 17 pass rollers 15, 16 into a second oven 18. Oven 18 is heated to a temperature of from about 140° to about 185° C. which completes the cure of the polyvinyl chloride layer 13 while the same is in direct contact with foam layer 17.

The bond between the layers 13, 17 has been found to be excellent despite the absence of supplemental adhesives. Furthermore, the layer 13 in the laminated product is free of distortions and is uniformly adhered to layer 17.

In the case of formulation 1, the oven 14 may be heated to 90–100° C., the oven 18 may be heated to 160–170° C. With formulation 2, the oven 14 is kept at about 110° C. and oven 18 at about 180° C. Using formulation 3, oven 14 is kept at 80° C., oven 18 at 160° C. and with formulation 4, oven 14 is kept at 110° C. and oven 18 at 180° C.

The belt conveyor 11 may have a paper or steel band surface for direct contact with layer 13, and may, if desired carry a transferable color pattern which will be imprinted on the outer surface of layer 13. Alternatively, the conveyor surface may have an endless embossing band for embossing the layer 13.

It is desirable that the foam layer 17 be brought into compressed contact with layer 13 at a point where the layer 13 is partially cured and fairly coherent thereby preventing the foam layer from pushing through layer 13 at that point of compression.

We claim:
1. The method of making a laminated article comprising bringing a preformed layer of polyester-diisocyanate foam into contact with an incompletely cured layer of plasticized polyvinyl chloride dispersion selected from the group consisting of plastisol and organosol, compressing the layers together and completing the cure of the polyvinyl choride layer.

2. The method of claim 1, wherein the polyvinyl chloride in powdered form is dispersed in a liquid plasticizer.

3. The method of claim 1, wherein the polyvinyl chloride is dispersed in organic solvents.

4. The method of making a laminated article comprising forming a layer of a plasticized polyvinyl chloride dispersion selected from the group consisting of plastisol and organosol, heating said layer to a temperature of from about 80° to about 120° C. to partially cure said layer, bringing a preformed layer of polyester-diisocyanate foam into contact with said partially cured polyvinyl chloride layer, compressing the combined layers and heating said layers to a temperature of from about 140° to about 185° C. to cure said polyvinyl chloride layer.

5. The method of making a laminated article comprising forming a layer of plasticized polyvinyl chloride dispersion selected from the group consisting of plastisol and organosol, which dispersion contains an agent for evolving a gas in said plasticized polyvinyl chloride dispersion to form pores therein during curing thereof at elevated temperature, heating said layer to a temperature to partially cure said layer, bringing a preformed layer of polyester-diisocyanate foam into contact with said partially cured layer, compressing the combined layers at their point of contact and thereafter heating the layers to a temperature to complete the cure of said polyvinyl chloride layer and to form pores in said polyvinyl chloride layer.

6. The method of making a laminated article comprising moving a layer of plasticized polyvinyl chloride dispersion selected from the group consisting of plastisol and organosol through a heated zone to incompletely cure said layer, bringing a preformed polyester-diisocyanate foam into contact with said moving layer and compressing said layers together at the point of contact, and thereafter moving the combined layers through a heated zone to complete the cure of said polyvinyl chloride layer.

References Cited in the file of this patent
UNITED STATES PATENTS

| | | |
|---|---|---|
| 2,404,073 | Karfiol et al. | July 16, 1946 |
| 2,577,281 | Simon et al. | Dec. 4, 1951 |
| 2,602,783 | Simon et al. | July 8, 1952 |
| 2,626,886 | Scholl | Jan. 27, 1953 |
| 2,650,212 | Windemuth | Aug. 25, 1953 |
| 2,698,272 | Clapp et al. | Dec. 28, 1954 |
| 2,712,311 | Scholl | July 5, 1955 |
| 2,713,884 | Schwartz | July 26, 1955 |
| 2,749,960 | Schwartz | June 12, 1956 |
| 2,759,475 | Van Swaay | Aug. 21, 1956 |
| 2,771,388 | Rocky et al. | Nov. 20, 1956 |

FOREIGN PATENTS

| | | |
|---|---|---|
| 805,708 | Germany | May 28, 1951 |
| 516,512 | Belgium | Jan. 15, 1953 |